US008640108B2

(12) United States Patent
Bellows et al.

(10) Patent No.: US 8,640,108 B2
(45) Date of Patent: Jan. 28, 2014

(54) METHOD FOR MANAGING HARDWARE RESOURCES WITHIN A SIMULTANEOUS MULTI-THREADED PROCESSING SYSTEM

(75) Inventors: Greg H. Bellows, Austin, TX (US); Brian H. Horton, Pflugerville, TX (US); Joaquin Madruga, Round Rock, TX (US); Barry L. Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 12/650,609

(22) Filed: Dec. 31, 2009

(65) Prior Publication Data
US 2011/0161935 A1    Jun. 30, 2011

(51) Int. Cl.
*G06F 9/44*    (2006.01)
(52) U.S. Cl.
USPC ............ 717/127; 717/100; 717/124; 717/131
(58) Field of Classification Search
USPC ......... 717/229, 227, 136–161, 100, 124, 127, 717/131; 712/229
See application file for complete search history.

(56) References Cited

U.S. PATENT DOCUMENTS

| 5,754,871 | A * | 5/1998 | Wilkinson et al. ............... 712/20 |
| 6,591,262 | B1 | 7/2003 | MacLellan et al. |
| 7,181,599 | B2 * | 2/2007 | DeWitt et al. ................. 712/227 |
| 7,574,424 | B2 | 8/2009 | Chowdhuri, Sr. |
| 7,774,558 | B2 * | 8/2010 | Ferren et al. .................. 711/154 |
| 2004/0111708 | A1 * | 6/2004 | Calder et al. .................. 717/131 |
| 2006/0048116 | A1 * | 3/2006 | Inglis et al. .................... 717/151 |
| 2006/0217940 | A1 * | 9/2006 | Cascaval et al. ............... 702/196 |
| 2006/0294498 | A1 * | 12/2006 | Partamian ...................... 717/106 |
| 2007/0021998 | A1 | 1/2007 | Laithwaite et al. |
| 2007/0101326 | A1 * | 5/2007 | Cai et al. ........................ 718/100 |
| 2007/0245133 | A1 * | 10/2007 | Weiberle et al. ............... 712/229 |
| 2008/0059968 | A1 * | 3/2008 | Cascaval et al. .............. 718/103 |
| 2008/0189692 | A1 * | 8/2008 | Inglis et al. .................... 717/154 |
| 2009/0031290 | A1 * | 1/2009 | Feng et al. ..................... 717/126 |
| 2009/0070352 | A1 * | 3/2009 | Karasudani et al. ........... 707/100 |
| 2009/0172306 | A1 * | 7/2009 | Nussbaum et al. ............ 711/154 |
| 2009/0217020 | A1 * | 8/2009 | Yourst ............................ 712/245 |

OTHER PUBLICATIONS

Daniels, RL.; "A multi-objective approach to resource allocation in single machine scheduling"; INSPEC/EJOR; Sep. 25, 1990.
Hsiung et al; "Energy Efficient Co-scheduling in Dynamically Reconfigurable Systems"; ACM Digital Library; pp. 87-92; Sep.-Oct. 2007.

* cited by examiner

*Primary Examiner* — Idriss N Alrobaye
*Assistant Examiner* — Getente A Yimer
(74) *Attorney, Agent, or Firm* — Yudell Isidore Ng Russell PLLC

(57) ABSTRACT

A technique for managing hardware resources and threads within a data processing system is disclosed. Compilation attributes of a function are collected during and after the compilation of the function. The pre-processing attributes of the function are also collected before the execution of the function. The collected attributes of the function are then analyzed, and a runtime configuration is assigned to the function based of the result of the attribute analysis. The runtime configuration may include, for example, the designation of the function to be executed under either a single-threaded mode or a simultaneous multi-threaded mode. During the execution of the function, real-time attributes of the function are being continuously collected. If necessary, the runtime configuration under which the function is being executed can be changed based on the real-time attributes collected during the execution of the function.

6 Claims, 3 Drawing Sheets

METHOD FOR MANAGING HARDWARE RESOURCES WITHIN A SIMULTANEOUS MULTI-THREADED PROCESSING SYSTEM

BACKGROUND OF THE INVENTION

1. Technical Field

The present disclosure relates to simultaneous multi-threaded processing systems in general, and in particular to a method for managing hardware resources and threads in a simultaneous multi-threaded processing system based on static function attributes and sampled heuristics.

2. Description of Related Art

One method of improving the performance of a multi-processor computer system operating under dynamically changing load requirements is through use of multiple processors that share the processing load by executing portions of a computer program or separate computer programs in parallel. In conjunction, the performance of the above-mentioned multi-processor computer system can be enhanced is to have multiple hardware threads executing on each processor where each thread processes a different workload or a different portion of one or more workloads.

A multi-processor computer system having multi-threaded capability can typically be configured to execute in a simultaneous multi-threaded (SMT) mode or a single-threaded (ST) mode during system initiation. Under the SMT mode, the multi-processor computer system is capable of supporting multiple threads being run simultaneously on each processor. On the other hand, under the ST mode, only one hardware thread can be active on each processor.

The present disclosure provides a method for managing program executions between the ST mode and the SMT mode within a multi-processor computer system.

SUMMARY OF THE INVENTION

In accordance with a preferred embodiment of the present disclosure, compilation attributes of a function are collected during and after the compilation of the function. The pre-processing attributes of the function are also collected before the execution of the function. The collected attributes of the function are then analyzed, and a runtime configuration is assigned to the function based of the result of the attribute analysis. The runtime configuration may include, for example, the designation of the function to be executed under either a single-threaded mode or a simultaneous multi-threaded mode. During the execution of the function, real-time attributes of the function are being continuously collected. If necessary, the runtime configuration under which the function is being executed can be changed based on the real-time attributes collected during the execution of the function.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
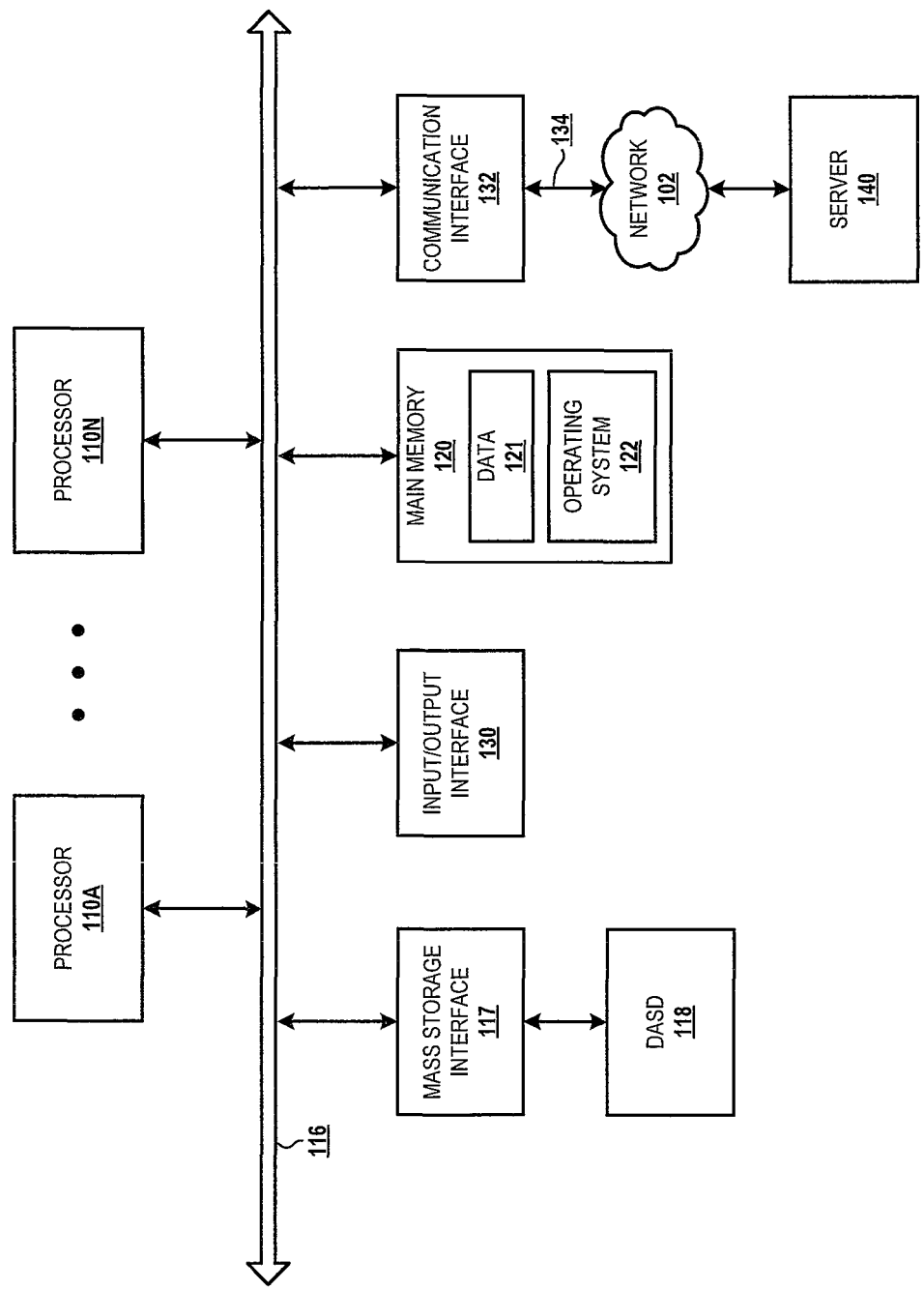
FIG. 1 is a block diagram of a multi-processor computer system, in accordance with one embodiment of the present disclosure.

With reference now to the drawings, and in particular to FIG. 1, there is depicted a block diagram of a multi-processor computer system, in accordance with one embodiment of the present disclosure. As shown, a multi-processor computer system 100 includes a bus 116 having low-latency and high-latency paths that are controlled by multiple bus controllers. Coupled to bus 116 are processors 110A-110N, a main memory 120, a mass storage device interface 117, an input/output (I/O) interface 130, and a communication interface 132.

Mass storage interface 117 is utilized to connect a direct access storage device (DASD) 118 to bus 116. I/O interface 130 can be utilized to connect input and output devices to bus 116. Examples of input devices include a keyboard, a mouse, and a touch screen. Examples of output devices include a display monitor, speakers, and printers. Communication interface 132 can be utilized to connect computer system 100 to a server 140 via a network 102.

Processors 110A-110N may be general purpose processors that, during normal operation, process data under the control of an operating system 122, middleware (not shown), application software (not shown), and any other code accessible from main memory 120 or DASD 118.

Main memory 120 may include dynamic and static storage devices for storing data 121 and operating system 122. Data 121 represents any data that serves as input to or output from any program in computer system 100. It is understood by those skilled in the art that computer system 100 may implement logical addressing that organizes all the available memory of the system into logical disks instead of individual memory component such as main memory 120 and DASD 118. Therefore, while data 121 and operating system 122 are depicted in FIG. 1 as residing in main memory 120, those skilled in the art will recognize that these components are not necessarily contained in main memory 120 at the same time.

Figure 2:
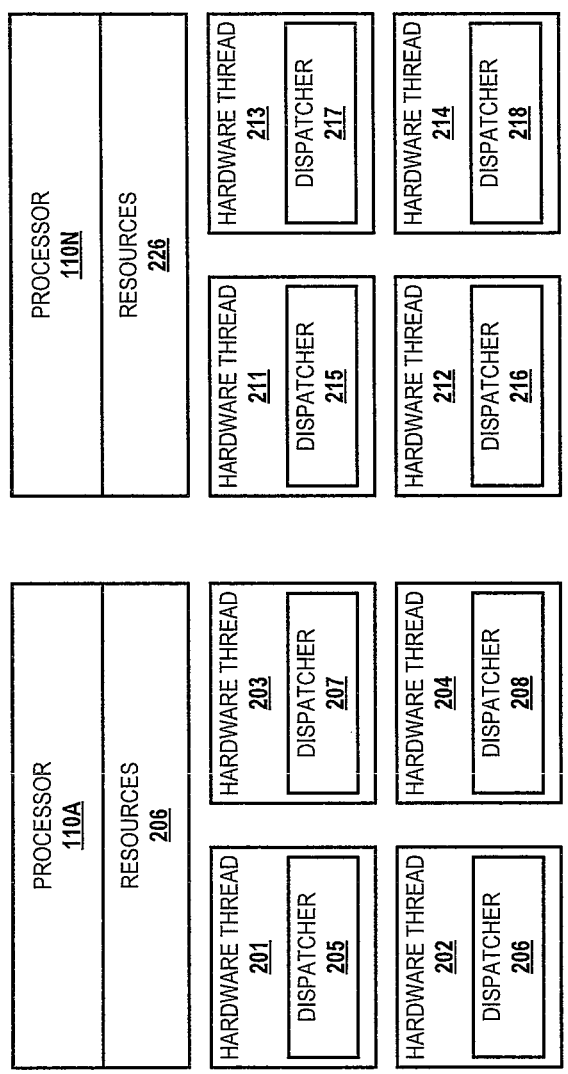
FIG. 2 is a detailed block diagram of two processors within the computer system from FIG. 1, in accordance with one embodiment of the present disclosure.

With reference now to FIG. 2, there is depicted a detailed block diagram of two processors within computer system 100 from FIG. 1, in accordance with one embodiment of the present disclosure. As shown, each of processors 110A and 110N can support multiple hardware threads. Each hardware thread represents a separate execution unit within a processor, where each execution unit within a processor shares resources of the processor, such as resources 206 and 226. The shared resources may include caches, translation look-ahead buffers (TLBs), registers, etc.

For the present embodiment, each of processors 110A and 110N can support four hardware threads simultaneously. For example, processor 110A supports hardware threads 201-204, and processor 110N supports hardware threads 211-214. In addition, each of processors 110A and 110N can support three different hardware threading modes, namely, ST mode, SMT2 mode and SMT4 mode. During ST mode, only one hardware thread is exposed to the operating system (i.e., operating system 122 from FIG. 1). During SMT2 mode, two hardware threads are exposed to the operating system. During SMT4 mode, all four hardware threads are exposed to the operating system.

From the operating system perspective, in order to enable SMT2 or SMT4 modes on processors 110A and 110N, either two or four of the hardware threads of each processor (i.e., hardware threads 201-204 of processor 110A and hardware threads 211-214 of processor 110N) must be activated, respectively. The operating system views an activated hardware thread as a logical processor.

For processors 110A and 110N, each hardware thread is handled by a separate dispatcher. As shown in FIG. 2, hardware threads 201-204 are handled by dispatchers 205-208, respectively, and hardware threads 211-214 are handled by dispatchers 215-218, respectively. During normal operation, a dispatcher reads its hardware thread's local run queue to access a next task to process.

An application software typically includes many functions. While enabling the SMT2 or SMT4 mode of all the processors within computer system 100 (from FIG. 1) may improve the execution time for those functions most of the time, activating only one hardware thread per processor can be more efficient at other times. In order to accommodate workloads that run more efficiently where fewer hardware threads are activated on each processor, some of the processors in computer system 100 should be switched from executing under the SMT2 or SMT4 mode to the ST mode before, during and/or after the execution of a function.

In accordance with a preferred embodiment of the present disclosure, a software runtime is capable of determining if each function within an application software is load/store bound or compute bound via resource analysis. The load/store bound functions are functions that require more memory resources, such as cache, during execution. In contrast, compute bound functions are functions that require more processor resources, such as hardware threads, during execution. The software application (or a user) may make a call to the software runtime via an application programming interface (API) to accelerate the execution speed of a function.

After the resource analysis, each function within the application software will be tagged with information such as load/store bound or compute bound. Basically, load/store bound functions will get fewer hardware threads and less compute time during execution. On the other hand, compute bound functions will get more hardware threads and more compute resources during execution. As such, during the execution of the application software, the software runtime may change the runtime configuration by directing the targeted processor into either the ST mode, SMT2 mode or SMT4 mode according to the tag associated with the function.

Figure 3:
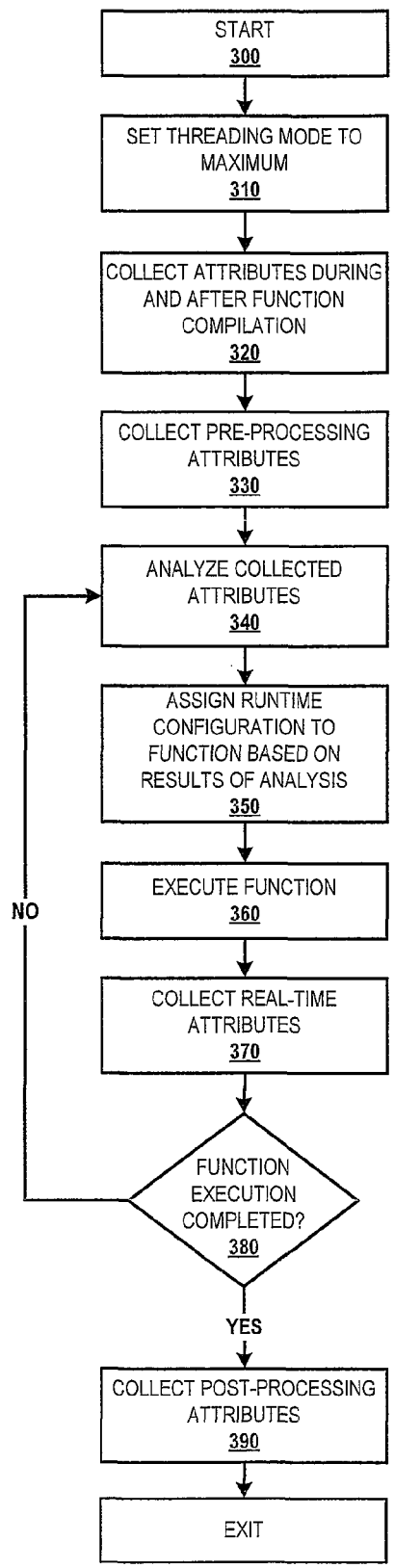
FIG. 3 is a high-level logic flow diagram of a method for managing hardware resources and threads within the computer system from FIG. 1, in accordance with one embodiment of the present disclosure.

Referring now to FIG. 3, there is depicted a high-level logic flow diagram of a method for managing hardware resources and threads within computer system 100 from FIG. 1, in accordance with one embodiment of the present disclosure. Starting at block 300, the threading mode of computer system 100 is initially set to the highest level (i.e., SMT4 for the present embodiment) for a function, as shown in block 310. The function is then compiled via a compiler. During compilation, compilation attributes of the function are collected, for example, by the compiler, as depicted in block 320. The compiler can also collected attributes of the function after compilation. Certain function details can be determined as part of the function compilation. The compiler can track and report static information pertaining to the behavior of the compiled function. Attributes such as branch behavior, instruction type counts and register usage are collected. In addition, statically allocated memory information are also available.

Compiler analysis and statistics can be utilized to determine the maximum threading level allowed for a function. The threading level may be reduced until the function register usage fits within the available set. Compiler analysis and statistics can also be utilized to adjust initial threading level of a function. The threading level may be adjusted to balance execution unit contention against performance.

For example, the threading level of the function should be reduced to the lowest level (i.e., ST mode) that can accommodate the function register count. This is a comparison of the static register count collected by the compiler against the architecture specific count for a given hardware threading level. Otherwise, the threading level of the function should be reduced when the function overloads a contentious execution unit. This decision is made based on weighing of the compiler collected instruction type counts against known contentious execution units for the current threading level.

Next, the pre-processing attributes are collected, as shown in block 330. The runtime environment that executes the function can assess certain usage characteristics. Attributes may include memory usage. Details such as the number and size of memory objects passed to a given function are utilized to optimize the scheduling configuration.

All collected attributes of the function are then analyzed, as depicted in block 340, and a runtime configuration (i.e., ST mode, SMT2 mode or SMT4 mode along with processor cache mode) is then assigned to the function based of the results of the analysis, as shown in block 350. The processor cache mode can be associated with the threading modes in different ways. Under an enhanced processor cache mode, for example, all cache resources of a deactivated processor are assigned to the remaining activated processor(s). Thus, the processor cache mode can be adjusted to increase the per-thread-shared cache size if large memory objects are supplied to a load/store bound function. The threading level can be reduced if an excessive number of memory objects are supplied to the load/store bound function in order to reduce contention over memory resources such as translation buffers. The runtime is fully aware of the runtime configuration being passed to the function.

Next, the function is executed, as depicted in block 360. During the function execution, real-time attributes are collected, as shown in block 370. Certain data can be obtained during real-time execution of the function. The data can be captured in the form of, for example, hardware performance counters that can be utilized for altering the runtime configuration.

A determination is then made whether or not the execution of the function has been completed, as depicted in block 380. If the execution of the function has not been completed, the process returns to block 340. Otherwise, if the execution of the function has been completed, the post-processing attributes are collected, as shown in block 390. The post-processing attributes are stored along with other collected attributes. Similar to real-time data capture, the post-processing attributes, such as hardware performance counters, can be utilized to make adjustments to the runtime configuration during subsequent function calls.

As has been described, the present disclosure provides a method for managing hardware resources, hardware threads and caches within a computer system. Basically, during and after execution, hardware counters related to execution unit stalls are monitored. The threading level of the function is reduced to ease contention on the overloaded execution unit.

Hardware counters related to cache misses are also monitored, and the processor cache mode can be adjusted to increase the per thread shared cache size to ease contention on the cache. Hardware counters related to translation misses are also monitored, and the threading level of the function can be reduced to ease contention on the translation units. In addition, hardware counters related to branch prediction stalls are monitored, and the threading level of the function is reduced to ease contention of branch prediction resources.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a circuit, module or system. Furthermore, the present disclosure may take the form of a computer program product embodied in any tangible medium of expression having computer-usable program code embodied in the medium.

Any combination of one or more computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave.

The computer-usable program code may be transmitted using any appropriate medium, including but not limited to wireless, wireline, optical fiber cable, RF, etc. Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local-area network (LAN) or a wide-area network (WAN), or the connection may be made to an external computer (for example, through the Internet using an Internet Service Provider).

While the disclosure has been particularly shown and described with reference to a preferred embodiment, it will be understood by those skilled in the art that various changes in form and detail may be made therein without departing from the spirit and scope of the disclosure.

What is claimed is:

1. A non-transitory computer readable device having a computer program product for managing hardware resources and threads within a data processing system, said computer readable device comprising:
   computer program code for collecting attributes of a function of an application software during and after compilation of said function;
   computer program code for collecting attributes of said function before execution of said function within a multiprocessor system, wherein said collecting further include collecting pre-processing memory usage attributes of said function before execution of said function;
   computer program code for assigning a runtime configuration to said function based on said collected attributes, wherein said runtime configuration includes a single-threaded (ST) mode and a simultaneous multi-threaded (SMT) mode capable of being supported by a plurality of processors within said multiprocessor system;
   computer program code for collecting attributes of said function during execution of said function within said multiprocessor system; and
   computer program code for re-assigning runtime configuration of said function between said ST mode and said SMT mode based on said collected attributes during execution of said function within said multiprocessor system, when necessary, such that said function is executed efficiently.

2. The computer readable device of claim 1, wherein said computer readable device further Includes
   computer program code for collecting attributes of said function after execution of said function; and
   computer program code for storing said collected attributes after execution of said function.

3. The computer readable device of claim 1, wherein said computer program code for collecting attributes of said function during and after compilation of said function further includes computer program code for collecting compilation attributes of said function during and after compilation of said function.

4. The computer readable device of claim 1, wherein said computer program code for collecting attributes of said function during execution of said function further includes computer program code for collecting real-time attributes of said function during execution of said function.

5. The computer readable device of claim 1, wherein only one hardware thread is exposed to an operating system during said ST mode, more than one hardware thread is exposed to said operating system during said SM mode.

6. The computer readable device of claim 5, wherein said runtime configuration further includes an enhanced processor cache mode during which all cache resources of a deactivated processor are assigned to any remaining activated processor.

* * * * *